April 15, 1924.

A. B. SMITH

TOOL HOLDER

Filed Feb. 5, 1923

1,490,346

INVENTOR.
Albert B. Smith
By E. J. Andrews
Atty.

Patented Apr. 15, 1924.                                                                1,490,346

UNITED STATES PATENT OFFICE.

ALBERT B. SMITH, OF COUNCIL BLUFFS, IOWA, ASSIGNOR TO SPRAGUE FOUNDRY & MANUFACTURING COMPANY, OF COUNCIL BLUFFS, IOWA, A CORPORATION OF IOWA.

TOOL HOLDER.

Application filed February 5, 1923. Serial No. 616,905.

*To all whom it may concern:*

Be it known that I, ALBERT B. SMITH, a citizen of the United States, residing at Council Bluffs, in the county of Pottawattamie and State of Iowa, have invented certain new and useful Improvements in Tool Holders, of which the following is a specification.

This invention relates to tool holders, and has for its object the production of a very powerful and effective tool holder to which the tool may be quickly clamped or unclamped and which may be used for a large variety of purposes, and particularly for holding tools which are being used on machine tools or other machines.

Figure 1:
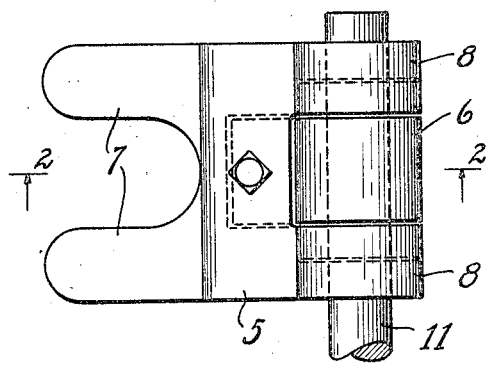
Figure 2:
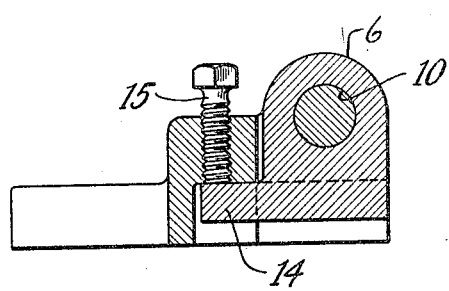
Figure 3:
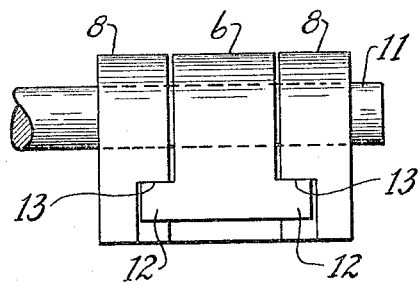
Figure 4:
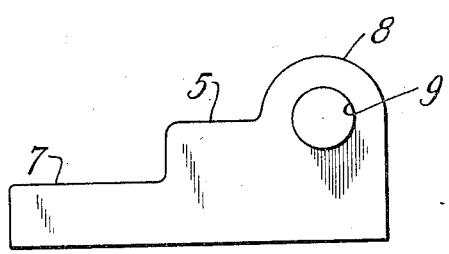

Of the accompanying drawings Fig. 1 is a plan view of the tool holder, with the handle of the tool in place, which embodies features of my invention; Fig. 2 is a sectional view of the same along the line 2—2 of Fig. 1; Fig. 3 is a rear elevation of the holder; and Fig. 4 is a side elevation of the frame of the holder.

The holder comprises two interlocking members, one being the frame or supporting member 5 and the other the clamping member 6. The frame has flanges 7 which are adapted to hold the tool holder in place, and it also has forwardly projecting flanges 8, through the central portions of which are coaxial openings 9. Through the clamping member 6 is an opening 10 which, when the tool is in use, registers substantially coaxially with the openings 9 in the frame 5. When the tool is to be clamped in the holder the handle 11 of the tool is passed through the openings 9 and 10. When thus in position flanges 12 on the clamping member are prevented, by shoulders 13 on the frame, from passing upwardly, and hence the member 6 can not be rotated on the tool handle; and by pressing downwardly on the rearwardly projecting flange 14 of the clamping member, by means of the screw 15 threaded into the frame, or in any other suitable manner, the handle may be very firmly clamped by the two members so that any movement of the handle, such as rotation thereof, is prevented. When it is desired to release the handle it is necessary only to unscrew slightly the screw 15 and the handle 11 may then be pulled out from the holes or rotated to any position which may be desired.

In this manner a very powerful clamping effect is produced upon the tool holder handle by a very simple means; and the clamping is sufficient to prevent in all ordinary cases any rotations of the handle, although it may be round as shown. By means of the round handle held in this manner the cutting edge, or other portions of the tool, may be very quickly and sensitively adapted or rotated to any desired angle or position and then may be instantly clamped in that position. At the same time the longitudinal position of the tool handle, and hence of the cutting edge, may be very quickly and sensitively positioned wherever desired; or both a longitudinal and a rotational movement may be made simultaneously and exactly as desired without any inconvenience resulting due to the unclamping or reclamping of the tool.

I claim as my invention:

1. A tool holder comprising two relatively movable members having opposing surfaces, said members normally having substantially coaxial openings through said surfaces, said openings being adapted to receive a portion of a tool to be held, and means for relatively angularly moving said members around an axis outside of the common axis of said openings.

2. A tool holder comprising a first member having a recess therein, a second member having a portion normally positioned in said recess, said first member having an opening through the wall of said recess, and said second member having an opening through the portion thereof normally in said recess, said two openings being normally coaxial and being adapted to receive a portion of a tool to be held, and means for angularly moving said two members relatively on a fulcrum eccentric to the axis of said openings.

3. A tool holder comprising a frame having two spaced opposing flanges the adjacent surfaces thereof being substantially parallel, a clamping member having a portion adapted to fit between said two surfaces, said frame having coaxial openings passing through said flanges, and said clamping member having an opening therethrough normally adapted to register with said flange openings, said various openings being adapted to receive a portion of a tool to be held, and means for forcibly moving said two members relatively angularly around an axis eccentric with said registering openings.

4. A tool holder comprising a frame having two spaced opposing flanges the adjacent surfaces thereof being substantially parallel, a clamping member having a portion adapted to fit between said two surfaces, said frame having coaxial openings passing through said flanges, and said clamping member having an opening therethrough normally adapted to register with said flange openings, said various openings being adapted to receive a portion of a tool to be held, said opposing flanges having shoulders thereon, and said clamping member having flanges projecting under said shoulders and thereby preventing relative rotating of said two members when said tool is in place, and means for producing a pressure tending to rotate relatively said two members.

5. A tool holder comprising a frame having two spaced but opposing flanges, said flanges having shoulders thereon, and a clamping member normally positioned between said flanges, said two members having registering coaxial holes therethrough adapted to receive the handle of a tool, said clamping member having lateral flanges projecting under said shoulders and normally preventing relative rotation of said members, said clamping member having another flange projecting under another portion of said supporting member, and a screw threaded into said supporting member with the inner end normally pressing against said last mentioned flange, whereby said screw when screwed inwardly tends to produce relative rotation of said two members and thus clamps the handle of the tool firmly in said openings.

In testimony whereof, I hereunto set my hand.

ALBERT B. SMITH.